US012081509B2

(12) United States Patent
Hui (10) Patent No.: US 12,081,509 B2
(45) Date of Patent: Sep. 3, 2024

(54) COMMUNICATION METHOD AND ELECTRONIC DEVICE FOR COMMUNICATING FROM A MOBILE COMMUNICATIONS NETWORK TO A NETWORK DEVICE AND A ROUTER

(71) Applicant: Huawei Technologies Co., Ltd., Shenzhen (CN)

(72) Inventor: Shaobo Hui, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/587,481

(22) Filed: Jan. 28, 2022

(65) Prior Publication Data
US 2022/0158972 A1    May 19, 2022

Related U.S. Application Data

(63) Continuation of application No. PCT/CN2020/105568, filed on Jul. 29, 2020.

(30) Foreign Application Priority Data

Jul. 30, 2019  (CN) .......................... 201910697093.0

(51) Int. Cl.
*H04L 61/2503* (2022.01)
*H04L 12/66* (2006.01)
(Continued)

(52) U.S. Cl.
CPC .......... *H04L 61/2503* (2013.01); *H04L 12/66* (2013.01); *H04L 45/74* (2013.01);
(Continued)

(58) Field of Classification Search
CPC ..... H04L 12/66; H04L 45/74; H04L 61/2503; H04L 61/4505; H04L 61/5007;
(Continued)

(56) References Cited

U.S. PATENT DOCUMENTS 9,112,919 B1 * 8/2015 Vinapamula Venkata ..................
H04L 61/256
9,258,272 B1    2/2016 Durand et al.
(Continued)

FOREIGN PATENT DOCUMENTS

CN    1901469 A    1/2007
CN    101282232 A    10/2008
(Continued)

OTHER PUBLICATIONS

"Series Q: Switching and Signalling, and Associated Measurements and Tests, Specifications of Signalling System No. 7—ISDN Supplementary Services, Stage 3 description for number identification supplementary services using Signalling System No. 7—Calling line identification presentation," ITU-T, Q.731.3, Apr. 2019, 26 pages.

(Continued)

*Primary Examiner* — Thomas J Dailey
(74) *Attorney, Agent, or Firm* — Conley Rose, P.C.

(57) ABSTRACT

A communication method applied to a customer-premises equipment (CPE), where the CPE works in a bridging mode, and the method includes that the CPE sends a first dialing request to a mobile communications network. The CPE accesses the mobile communications network after receiving a first dialing response. The CPE bridges a first public Internet Protocol (IP) address in the first dialing response to a router connected to the CPE. The CPE sends a second dialing request to the mobile communications network after accessing the mobile communications network. The CPE receives a second dialing response, obtains a second public IP address from the second dialing response, and establishes a logical link to the mobile communications network to communicate with the mobile communications network without relying on the router connected to the CPE.

21 Claims, 4 Drawing Sheets

(51) Int. Cl.
  *H04L 45/74* (2022.01)
  *H04L 61/4505* (2022.01)
  *H04L 61/5007* (2022.01)
  *H04L 65/00* (2022.01)
  *H04W 8/20* (2009.01)
  *H04W 8/26* (2009.01)
  *H04W 48/16* (2009.01)

(52) U.S. Cl.
  CPC ...... *H04L 61/4505* (2022.05); *H04L 61/5007* (2022.05); *H04L 65/00* (2013.01); *H04W 8/20* (2013.01); *H04W 8/26* (2013.01); *H04W 48/16* (2013.01)

(58) Field of Classification Search
  CPC .......... H04L 65/00; H04W 8/20; H04W 8/26; H04W 48/16
  See application file for complete search history.

(56) References Cited

U.S. PATENT DOCUMENTS

| | | | |
|---|---|---|---|
| 10,819,676 B1* | 10/2020 | Kolanowski | H04W 4/50 |
| 2011/0138063 A1 | 6/2011 | Wu | |
| 2012/0297087 A1 | 11/2012 | Humble et al. | |
| 2015/0237018 A1 | 8/2015 | Parry et al. | |
| 2019/0052599 A1* | 2/2019 | Caserta | H04L 51/066 |
| 2019/0141572 A1 | 5/2019 | Zaks et al. | |
| 2019/0320018 A1* | 10/2019 | Karaje | H04L 67/1095 |
| 2020/0162419 A1 | 5/2020 | Zeng | |

FOREIGN PATENT DOCUMENTS

| | | | |
|---|---|---|---|
| CN | 102143233 A | 8/2011 | |
| CN | 103476019 A | 12/2013 | |
| CN | 106302839 A | 1/2017 | |
| CN | 106713100 A | 5/2017 | |
| CN | 107835257 A | 3/2018 | |
| CN | 108737585 A | 11/2018 | |
| CN | 108886477 A | 11/2018 | |
| CN | 109150687 A | 1/2019 | |
| CN | 109274590 A | 1/2019 | |
| CN | 109327885 A | 2/2019 | |
| CN | 110572817 A | 12/2019 | |
| EP | 3432518 A1 | 1/2019 | |
| EP | 3614649 A1 | 2/2020 | |
| WO | 2019041247 A1 | 3/2019 | |

OTHER PUBLICATIONS

Jeff Bernstein et al., "Technical Report DSL Forum TR-111 Applying TR-069 to Remote Management of Home Networking Devices," Applying TR-069 to Remote Management of Home Networking Devices, Dec. 2005, 29 pages.

* cited by examiner

COMMUNICATION METHOD AND ELECTRONIC DEVICE FOR COMMUNICATING FROM A MOBILE COMMUNICATIONS NETWORK TO A NETWORK DEVICE AND A ROUTER

CROSS-REFERENCE TO RELATED APPLICATIONS

This is a continuation of International Patent Application No. PCT/CN2020/105568 filed on Jul. 29, 2020, which claims priority to Chinese Patent Application No. 201910697093.0 filed on Jul. 30, 2019. The disclosures of the aforementioned applications are hereby incorporated by reference in their entireties.

TECHNICAL FIELD

This application relates to the field of communications technologies, and in particular, to a communication method and an electronic device.

BACKGROUND

In order to improve a data transmission rate, a millimeter wave is applied to a fifth generation (5G) mobile communications network (5G network). However, the millimeter wave has characteristics of a relatively high attenuation and a relatively weak diffraction capability during transmission in air. Therefore, with large-scale commercial use of the 5G network, outdoor deployment will become a main form. Further, outdoor deployment usually uses a networking architecture of a customer-premises equipment (CPE) and a WI-FI router. The CPE is deployed outdoors, and the WI-FI router is deployed indoors, to provide a high-speed Internet access service for a home. However, many services (such as a remote home storage and a virtual private network (VPN)) require the WI-FI router to expose a public Internet Protocol (IP) address to the outside. Therefore, in an existing communications mechanism, after the CPE is powered on, the CPE works in a bridging mode by default, and after obtaining a public IP address allocated by the 5G network, transparently transmits the public IP address to the WI-FI router.

Therefore, the CPE does not have a public IP address when working in the bridging mode. To enable the CPE to communicate with a remote device by using the WI-FI router, and implement remote management performed by the remote device on the CPE, in a conventional technology, a private IP address is usually preconfigured in the CPE, and message exchange may be implemented between the CPE and the WI-FI router by using the private IP address. However, the 5G network cannot identify the private IP address. Therefore, the CPE cannot communicate with the 5G network by using the private IP address. However, the WI-FI router can communicate with the remote device by using the 5G network, so that the CPE can communicate with the remote device by using the WI-FI router. For example, after the WI-FI router receives a message that is sent by the remote device by using the 5G network, because a destination IP address of the message is a public IP address, the CPE sends the message to the WI-FI router. The WI-FI router identifies whether the message is a message sent to the CPE. If the message is a message sent to the CPE, the WI-FI router changes the destination IP address of the message from the public IP address to the private IP address preconfigured in the CPE, and then sends the message to the CPE for corresponding processing.

The foregoing technical solution helps resolve a problem of how the CPE communicates with the remote device by using the 5G network when the CPE does not have a public IP address. However, the CPE and the WI-FI router need to be used together, leading to a defect of a relatively high coupling degree.

SUMMARY

Embodiments of this application provide a communication method and an electronic device, to help a CPE to communicate with a mobile communications network without relying on a router connected to the CPE, so that the CPE is decoupled from the router.

According to a first aspect, an embodiment of this application provides a communication method. The method is applied to a CPE, the CPE works in a bridging mode, and the method includes the following.

The CPE sends a first dialing request to a mobile communications network. The first dialing request includes a data network name, and the data network name is used to indicate a type of the mobile communications network. The CPE receives a first dialing response that is returned by the mobile communications network based on the first dialing request, and accesses the mobile communications network. The first dialing response includes a first public IP address. Then, the CPE bridges the first public IP address in the first dialing response to a router connected to the CPE. The CPE sends a second dialing request to the mobile communications network after accessing the mobile communications network. The second dialing request includes the data network name. The CPE receives a second dialing response that is returned by the mobile communications network based on the second dialing request. The second dialing response includes a second public IP address. The CPE obtains the second public IP address from the second dialing response, and establishes a logical link to the mobile communications network.

After accessing the mobile communications network, and before obtaining the second public IP address and establishing the logical link to the mobile communications network, when receiving a first message sent by the mobile communications network, the CPE forwards the first message to the router connected to the CPE.

After obtaining the second public IP address and establishing the logical link to the mobile communications network, when receiving a second message sent by the mobile communications network, the CPE determines whether the second message includes a first identifier. The first identifier is used to identify that the message belongs to the CPE. If the second message includes the first identifier, the CPE processes the second message. If the second message does not include the first identifier, the CPE forwards the second message to the router.

In this embodiment of this application, after accessing the mobile communications network, the CPE can obtain the second public IP address from the mobile communications network by re-initiating a dialing procedure. Therefore, the CPE can communicate with the mobile communications network based on the second public IP address without relying on the router connected to the CPE, so that the CPE is decoupled from the router.

It should be noted that, in this embodiment of this application, the router connected to the CPE is a device under the CPE, and therefore may also be referred to as a router under the CPE.

In a possible design, the first public IP address is the same as the second public IP address. This helps save network resources.

In a possible design, the CPE does not store the first public IP address, and the CPE stores the second public IP address. This helps implement compatibility with an existing technical solution.

In a possible design, the CPE may send the second dialing request to the mobile communications network in the following manner. The CPE periodically sends the second dialing request to the mobile communications network. Alternatively, the CPE sends the second dialing request to the mobile communications network when detecting a first trigger event. This helps simplify an implementation.

In a possible design, the CPE may process the second message in the following manner.

The CPE replaces the second public IP address and the first identifier in the second message with a private IP address preconfigured in the CPE, to obtain a third message, and the CPE processes the third message. This helps isolate the second public IP address by the CPE.

In a possible design, the first identifier is a port number in reserved port numbers. This helps simplify an implementation.

In a possible implementation, the first identifier is preconfigured by the CPE. This helps simplify an implementation and reduce complexity of the implementation.

In a possible design, after establishing the logical link to the mobile communications network, and before receiving the second message sent by the mobile communications network, the CPE sends a fourth message to the mobile communications network. The fourth message includes the second public IP address, the first identifier, and a destination IP address, the destination IP address is used to indicate a device that is to receive the third message, and the fourth message is used to notify the first identifier to the device indicated by the destination IP address. This helps simplify an implementation.

In a possible design, before the CPE sends the fourth message to the mobile communications network, the CPE generates a fifth message, where the fifth message includes the private IP address preconfigured in the CPE, and replaces the private IP address in the fifth message with the second public IP address and the first identifier, to obtain the fourth message. This helps isolate the second public IP address by the CPE.

In a possible design, when detecting a second trigger event, the CPE releases the logical link to the mobile communications network and deletes the second public IP address. This helps save resources.

According to a second aspect, an embodiment of this application provides an electronic device, including a processor, a memory, and a transceiver. The memory stores program instructions. The transceiver is configured to send and receive messages. When the program instructions are executed by the processor, the CPE is enabled to perform the method according to the first aspect and any possible design of the first aspect.

According to a third aspect, an embodiment of this application provides an electronic device. The electronic device includes the apparatus that performs the method according to the first aspect and any possible design of the first aspect.

According to a fourth aspect, an embodiment of this application provides a chip. The chip is coupled to a memory in a device. Therefore, when the chip runs, a computer program stored in the memory is invoked to implement the method according to the first aspect and any possible design of the first aspect in the embodiments of this application.

According to a fifth aspect, an embodiment of this application provides a computer storage medium. The computer storage medium stores a computer program, and when the computer program is run on an electronic device, the device is enabled to perform the method according to the first aspect and any possible design of the first aspect in the embodiments of this application.

According to a sixth aspect, an embodiment of this application provides a computer program product. When the computer program product is run on an electronic device, the electronic device is enabled to perform the method according to the first aspect and any possible design of the first aspect in the embodiments of this application.

According to a seventh aspect, an embodiment of this application provides a communications system, including the electronic device according to any possible design of the second aspect or the third aspect, and a router.

In addition, for technical effects brought by any possible design in the second to the seventh aspects, refer to technical effects brought by different designs in the method part. Details are not described herein again.

DESCRIPTION OF EMBODIMENTS

It should be understood that, unless otherwise stated in this application, "|" means or. For example, AB may represent A or B. In this specification, the term "and/or" describes only an association relationship for describing associated objects and represents that three relationships may exist. For example, A and/or B may represent the following cases: only A exists, both A and B exist, and only B exists. "At least one" means one or more, and "a plurality of" means two or more.

In this application, the term "example", "in some embodiments", "in some other embodiments", or the like is used to represent giving an example, an illustration, or a description. Any embodiment or design solution described as an "example" in this application should not be explained as being more preferred or having more advantages than another embodiment or design solution. Exactly, "for example" is used to present a concept in a specific manner.

In addition, terms such as "first" and "second" in this application are used only for distinguishing. The terms cannot be understood as indicating or implying relative importance or implicitly indicating a quantity of indicated technical features. The terms also cannot be understood as indicating or implying a sequence.

It should be understood that a signal in the embodiments of this application is a message transmission form, for example, a 5G signal or a WI-FI signal. A message is content transferred by the signal, for example, a related parameter, such as an access point name (APN), transferred when an outdoor unit (ODU) initiates dialing to a 5G network.

Figure 1:
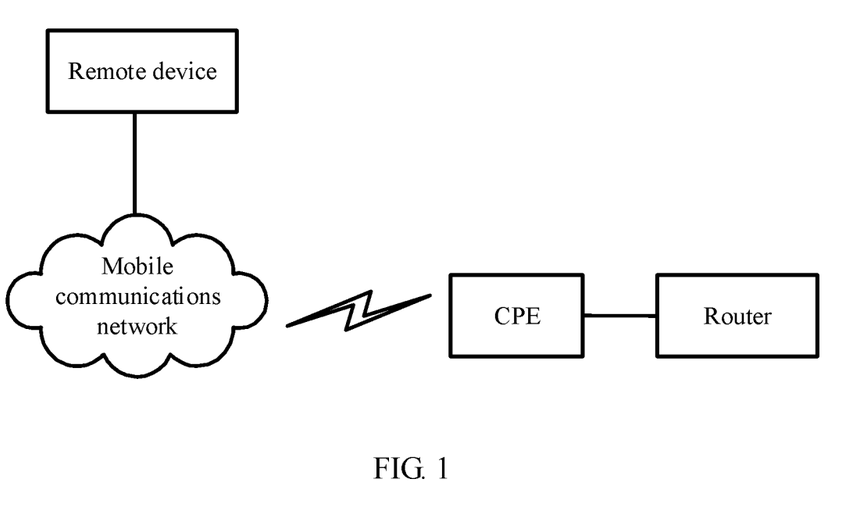
FIG. 1 is a schematic diagram of an application scenario according to an embodiment of this application.

For example, FIG. 1 is a schematic diagram of a network architecture to which an embodiment of this application is applicable. As shown in FIG. 1, the network architecture in this embodiment of this application includes a mobile communications network, a CPE, a router, and a remote device.

The mobile communications network may be a 5G network, a 4G network, or the like, or may be a future mobile communications network, such as a 6G network. This is not limited. The CPE is deployed outdoors, and may also be referred to as an ODU, a wireless CPE, or the like, which is a device configured to convert a mobile communication signal into a wireless communication signal or convert a wireless communication signal into a mobile communication signal. The mobile communication signal is a signal transmitted in the mobile communications network. For example, if the mobile communications network is a 5G network, the mobile communication signal is a 5G signal. For another example, if the mobile communications network is a fourth generation (4G) network, the mobile communication signal is a 4G signal. The wireless communication signal is a signal transmitted in a wireless communications network. The wireless communications network may be a wireless local area network (WLAN), a WI-FI network, or the like. For example, if the wireless communications network is a WI-FI network, the wireless communication signal is a WI-FI signal. The router is deployed indoors, and may also be referred to as an indoor unit (IDU), a WI-FI router, a device under the CPE, or the like, which may be configured to provide a wireless communications network access service. For example, an electronic device such as a mobile phone, a tablet computer, a wearable device, or a smart household device may access the wireless communications network by using the router, to implement an Internet access function. It should be noted that the router and the CPE may be connected in a wireless manner or a wired manner.

For example, the mobile communications network is a 5G network, and the device (that is, the router shown in FIG. 1) under the CPE is a WI-FI router. The CPE may convert a received 5G signal from the 5G network into a WI-FI signal and send the WI-FI signal to the router, and may convert a received WI-FI signal from the router into a 5G signal and send the 5G signal to the 5G network, thereby implementing communication between the router and the 5G network.

The remote device may be a device such as an over-the-air (OTA) upgrade server or an auto-configuration server (ACS) that is configured to remotely manage the CPE, or may be another device. It should be noted that the remote device in this embodiment of this application may be a virtual functional entity, or may be a physical device. This is not limited.

Figure 2:
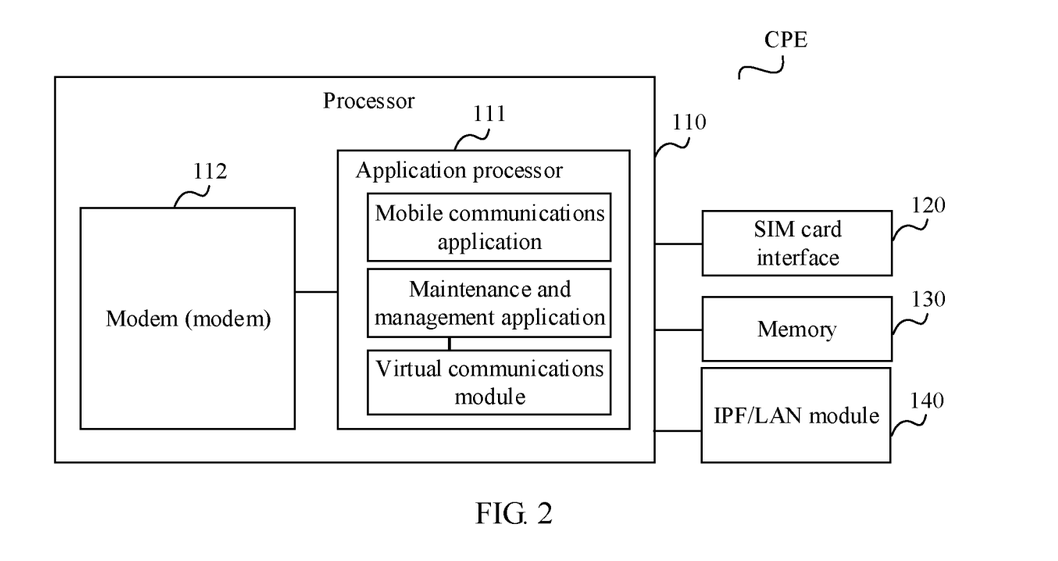
FIG. 2 is a schematic diagram of a hardware architecture of an electronic device according to an embodiment of this application.

After powered on, the CPE works in a bridging mode by default. In the bridging mode, the CPE does not have a public IP address. When working in the bridging mode, the CPE is similar to a bridge. To enable the CPE to communicate with the remote device in the bridging mode without relying on the router, the CPE in this embodiment of this application may have a hardware architecture shown in FIG. 2. As shown in FIG. 2, the ODU includes a processor 110, a subscriber identification module (SIM) card interface 120, a memory 130, and an IP function (IPF)/local area network (LAN) module 140.

It should be understood that the hardware structure shown in FIG. 2 is merely an example. The CPE in this embodiment of this application may have more or fewer components than those shown in the figure, may combine two or more components, or may have different component configurations. Components shown in figure may be implemented in hardware, software, or a combination of hardware and software that includes one or more signal processing and/or application-specific integrated circuits.

The processor 110 may include one or more processing units. For example, the processor 110 may include an application processor (AP) 111 and a modem 112. In addition, the processor 110 may further include a baseband processor or the like. Different processing units may be independent components, or may be integrated into one or more processors. Further, the CPE may run one or more application programs on the application processor 111 to implement one or more functions. For example, before the CPE accesses the mobile communications network, the CPE may run a mobile communications application on the application processor 111 to drive the modem 112 to initiate a dialing procedure to the mobile communications network. For another example, the CPE may further run a maintenance and management application on the application processor 111 to upgrade or maintain a system of the CPE. However, to implement upgrade or maintenance of the system of the CPE, the CPE usually needs to interact with the remote device (for example, the OTA upgrade server). To enable the CPE to independently interact with the remote device, the embodiments of this application provide a communication method, so that after the CPE accesses the mobile communications network, when the maintenance and management application needs to interact with the remote device, a virtual communications module is triggered to drive the modem 112 to re-initiate a dialing procedure to the mobile communications network, to obtain a public IP address, and implement interaction with the remote device. For specific related descriptions, refer to a communication method shown in FIG. 3.

In some embodiments, a buffer may be further disposed in the processor 110 to store a computer program and/or data. For example, the buffer in the processor 110 may be a cache. The buffer may be configured to store instructions and/or data that are just used, generated, or recycled by the processor 110. If the processor 110 needs to use the instructions or the data again, the processor 110 may directly invoke the instructions or the data from the buffer. This helps reduce time for the processor 110 to obtain the instructions or the data, and helps improve system efficiency.

The SIM card interface 120 is configured to connect to a SIM card. The SIM card may be inserted into the SIM card interface 120 or plugged from the SIM card interface 120, to implement contact with or separation from the CPE. The SIM card interface 120 may support a nano-SIM card, a micro-SIM card, a SIM card, and/or the like. The ODU interacts with the mobile communications network by using a SIM card. In some embodiments, the CPE may further use embedded SIM (eSIM), that is, an embedded SIM card. The eSIM card may be embedded into the CPE, and cannot be separated from the CPE.

The memory 130 is configured to store a computer program and/or data. The computer program includes one or more instructions. In some embodiments, the memory 130 includes a program storage area and a data storage area. The program storage area may be configured to store a system program, a computer program (such as a dialing function or an IP address conversion function) required by at least one function, and the like. The data storage area may be configured to store data (for example, a data network name) created and/or obtained in a process of using the CPE, and the like. For example, the processor 110 may invoke the program and/or the data stored in the memory 130, to enable the CPE to perform a corresponding method, so as to implement one or more functions. For example, the processor 110 invokes some computer programs and/or data in the memory 130, to enable the CPE to perform the communication method provided in the embodiments of this application. The memory 130 may use a high-speed random-access memory (RAM), a non-volatile memory, and/or the like. For example, the non-volatile memory may include at least one of one or more disk memory devices, flash memory devices, and/or Universal Flash Storages (UFSs).

The IPF/LAN module 140 is configured to convert a mobile communication signal into a wireless communication signal, or convert a wireless communication signal into a mobile communication signal. For example, the IPF/LAN module 140 includes an IPF module and a LAN module. In some other embodiments, the IPF/LAN module 140 may further include an accelerator, and the accelerator is configured to implement high-speed signal transmission.

The method according to the embodiments of this application is described below with reference to FIG. 1 and FIG. 2.

Figure 3:
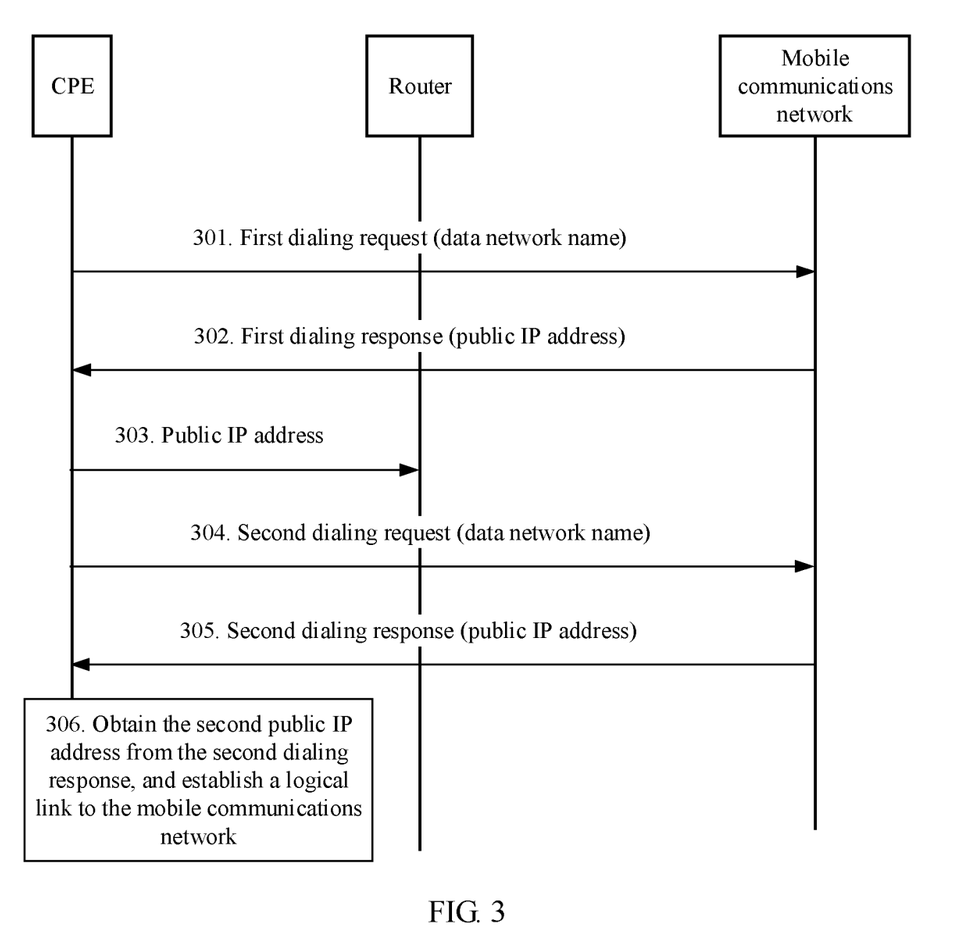
FIG. 3 is a schematic flowchart of a communication method according to an embodiment of this application.

For example, FIG. 3 is a schematic flowchart of a communication method according to an embodiment of this application. The communication method includes the following steps.

301. The CPE sends a first dialing request to the mobile communications network. The first dialing request includes a data network name, and the data network name is used to indicate a type of the mobile communications network. For example, the type of the mobile communications network in this embodiment of this application may refer to a standard (for example, third generation (3G), 4G, or 5G) of the mobile communications network, and/or an operator (for example, China Mobile or China Unicom) to which the mobile communications network belongs. For example, the data network name may include a network identifier and an operator identifier. It should be noted that the data network name may be different in different mobile communications networks. For example, in a 4G network, the data network name may also be referred to as an APN. For another example, in a 5G network, the data network name may be referred to as a data network name (DNN). In some embodiments, the data network name may be obtained by the CPE from a SIM card pre-installed on the CPE.

It should be noted that the CPE sends the first dialing request to the mobile communications network before the CPE accesses the mobile communications network. For example, the CPE may send the first dialing request to the mobile communications network when the CPE is powered on for the first time after delivered from a factory, or send the first dialing request to the mobile communications network when the CPE is powered on for the first time after SIM card replacement.

The CPE hardware architecture shown in FIG. 2 is used as an example. Before the CPE accesses the mobile communications network, the application processor 111 invokes the mobile communications application, to obtain a data network name from a SIM card connected to the SIM card interface 120, and then send an AT instruction to the modem 112 to drive the modem 112 to send a first dialing request to the mobile communications network based on the data network name obtained from the SIM card connected to the SIM card interface 120. For the AT instruction, refer to related descriptions in a conventional technology. Details are not described herein.

302. After receiving the first dialing request sent by the CPE, the mobile communications network allocates a public IP address to the CPE based on the data network name, and sends a first dialing response to the CPE. The first dialing response includes the public IP address.

303. After receiving the first dialing response, the CPE bridges the public IP address in the first dialing response to the router under the CPE. After powered on, the CPE works in a bridging mode by default if a user does not perform special setting. Therefore, after obtaining the public IP address from the first dialing response, the CPE bridges the public IP address to the router under the CPE. The CPE does not store the public IP address obtained from the first dialing response. In other words, the CPE does not retain the public IP address in the first dialing response.

It should be noted that, after receiving the first dialing response, the CPE completes establishment of a communications link between the CPE and the mobile communications network, so that the CPE accesses the mobile communications network.

The CPE hardware architecture shown in FIG. 2 is used as an example. Before the CPE accesses the mobile communications network, the modem 112 receives the first dialing response, determines that the dialing succeeds, accesses the mobile communications network, and sends the first dialing response to the application processor 111. The application processor 111 invokes the mobile communications application, and sends the public IP address in the first dialing response to the IPF/LAN module 140. Then, the IPF/LAN module 140 generates a wireless communication signal based on the public IP address, and sends, to the router under, the wireless communication signal that carries the public IP address.

304. The CPE sends a second dialing request to the mobile communications network after accessing the mobile communications network. The second dialing request includes a data network name. The data network name included in the second dialing request is the same as the data network name included in the first dialing request.

In some embodiments, after accessing the mobile communications network, the CPE may send the second dialing request to the mobile communications network in a periodic and/or event-triggered manner. In this way, the CPE working in the bridging mode obtains the public IP address after accessing the mobile communications network. For example, when determining that a service request (for example, a system upgrade request) needs to be sent to the remote device, the CPE sends the second dialing request to the mobile communications network. For another example, when the CPE reaches a fixed period or an event trigger (power-on), the CPE sends the second dialing request to the mobile communications network.

The CPE hardware architecture shown in FIG. 2 is used as an example. After the CPE accesses the mobile communications network, the application processor 111 invokes the maintenance and management application. When the maintenance and management application detects that a fixed period is reached or a trigger event is met, the virtual communications module is started. The modem 112 is driven by the virtual communications module to send a second dialing request to the mobile communications network based on the data network name obtained from the SIM card connected to the SIM card interface 120. It should be noted that the virtual communications module may also be referred to as a virtual communications application, a virtual network interface card, or the like. This is not limited. In addition, it should be further noted that the virtual communications module may run on a processing unit independent of the application processor 111.

305. The mobile communications network receives the second dialing request, allocates a public IP address to the CPE based on the data network name, and sends a second dialing response to the CPE. The second dialing response includes the public IP address. It should be noted that the public IP address included in the second dialing response is the same as the public IP address included in the first dialing response, that is, public IP addresses allocated by the mobile communications network based on same data network names are the same.

306. After receiving the second dialing response, the CPE obtains the public IP address from the second dialing response, and establishes a logical link (or a logical channel) between the CPE and the mobile communications network. It should be noted that the public IP address obtained by the CPE from the second dialing response is not sent to the router under the CPE, but is stored or buffered in the CPE. In this way, after accessing the mobile communications network, the CPE working in the bridging mode can obtain a public IP address by initiating a dialing procedure to the mobile communications network, which helps enable the CPE to independently communicate with the remote device, thereby achieving an objective of decoupling between the CPE and the router. Moreover, the data network name used by the CPE to initiate the dialing procedure to the mobile communications network after the CPE accesses the mobile communications network is the same as the data network name used by the CPE to initiate the dialing procedure to the mobile communications network before the CPE accesses the mobile communications network, which further helps save network resources.

In addition, because the data network name used by the CPE to initiate the dialing procedure to the mobile communications network after the CPE accesses the mobile communications network is the same as the data network name used by the CPE to initiate the dialing procedure to the mobile communications network before the CPE accesses the mobile communications network in this embodiment of this application, a CPE that can perform the communication method in this embodiment of this application may be further referred to as a CPE that has a capability of sharing a data network name in this embodiment of this application.

The CPE hardware architecture shown in FIG. 2 is used as an example. After the CPE accesses the mobile communications network, after receiving the second dialing response, the modem 112 sends the second dialing response to the application processor 111. The application processor 111 invokes the virtual communications module to obtain the public IP address from the second dialing response, buffer or store the public IP address obtained from the second dialing response in a specific memory of the CPE, and establish a logical link between the virtual communications module and the mobile communications network. For example, the specific memory configured to store or buffer the public IP address may be the memory 130, a buffer in the processor 110, or a dedicated memory.

It should be noted that, after step 303 is performed and before step 306 is performed, when receiving a message sent by the mobile communications network, the CPE forwards the message to the router under the CPE for corresponding processing.

Further, after step 306, that is, after the CPE obtains the public IP address from the second dialing response, and establishes the logical link between the CPE and the mobile communications network, the CPE may further communicate with the mobile communications network based on the public IP address. However, public IP addresses in the CPE and the router under the CPE are the same. Therefore, to ensure normal communication between the router under the CPE and the mobile communications network and between the CPE and the mobile communications network, in this embodiment of this application, messages sent by the mobile communications network to the CPE and the router under the CPE may be distinguished by using a specific identifier. For example, the specific identifier may be a port number, or may be a customized identifier. This is not limited. For example, the specific identifier is a port number. The port number may be agreed upon in advance by using a communications protocol, or may be randomly allocated by the mobile communications network and then notified to the CPE, or determined by the CPE based on a preset algorithm.

For example, when the CPE needs to communicate with the remote device (for example, an OTA upgrade server or an ACS), the CPE may randomly determine a first port number from reserved port numbers, to use the first port number to identify a message that belongs to the CPE. The first port number may be notified to the remote device by using a message sent to the remote device. The message sent to the remote device may be a specific message (for example, a dedicated message used to notify the first port number), or may be another message (for example, a message such as a service request).

For example, when the CPE needs to update or maintain a system of the CPE, the CPE may need to establish communication with the remote device. To enable the remote device to determine that a received message is a message from the CPE, for example, after step 306, the CPE sends a message 1 to the mobile communications network. The message 1 includes a destination IP address, the public IP address, and the first port number. After receiving the message 1, the mobile communications network may send the message 1 to a corresponding device based on the destination IP address. For example, the destination IP address is an IP address of the remote device, and the mobile communications network may send the message 1 to the remote device. After receiving the message 1, the remote device may determine, based on the public IP address and the first port number in the message 1, that the message 1 comes from the CPE. In addition, because the remote device may further obtain the first port number by using the message 1, the message 1 may also be used to notify the remote device of the first port number, so that when returning a message 2 to the CPE based on the message 1, the remote device may add the public IP address and the first port number to the message 2. In this way, after receiving the message 2, the CPE can determine that the message 2 includes the first port number, and does not send the message 2 to the router under the CPE, but directly performs corresponding processing on the message 2.

For example, the message 1 may be a service request such as an OTA system upgrade request or maintenance request, or another message. This is not limited. For example, when the message 1 is an OTA system upgrade request, the message 2 may be an OTA system upgrade response. For example, after obtaining the public IP address from the second dialing response and establishing the logical link to the mobile communications network, when detecting that a trigger event is met, the CPE may send a first service request to the mobile communications network. The first service request is used to request the remote device to update the system of the CPE. The first service request includes the public IP address, the first port number, and a destination IP address, and the destination IP address is the IP address of the remote device. After receiving the first service request, the mobile communications network sends the first service request to the remote device based on the destination IP address. The remote device obtains the public IP address and the first port number from the first service request, and determines, based on the public IP address and the first port number, that the first service request comes from the CPE. Then, the remote device adds, to a response to the first service request, the public IP address, the first port number, and related information required by the CPE to update the system of the CPE, and sends the response to the CPE. In this way, after receiving the response to the first service request, the CPE can determine, based on the first port number, that the response to the first service request is a message belonging to the CPE, and then the CPE can update the system of the CPE based on the related information that is carried in the response to the first service request and that is required by the CPE to update the system of the CPE.

For example, the event that triggers the CPE to send the first service request to the mobile communications network may be that network signal strength of the CPE is continuously less than a first threshold longer than a preset duration, or a packet loss rate exceeds a second threshold. The first threshold, the second threshold, and the preset duration may be correspondingly set based on an actual requirement. This is not limited.

In addition, when receiving a message 3, and determining that the message 3 does not include the first port number, the CPE forwards the message 3 to the router under the CPE, and the router performs corresponding processing on the message 3.

In some other embodiments, a private IP address may be further preconfigured in the CPE (before or after delivery from a factory). However, the private IP address is usually located in a different network segment than the public IP address. For example, the private IP address is 192.168.5.20, and the public IP address is 10.132.17.10. Therefore, the private IP address cannot be identified by the mobile communications network or the remote device. Therefore, after obtaining the public IP address from the second dialing response and establishing the logical link to the mobile communications network, when the CPE needs to send a message to the remote device, the CPE may first generate a message a based on the private IP address. The message a includes the private IP address. Then, the CPE replaces the private IP address in the message a with the public IP address and the first port number, to obtain a message b, and sends the message b to the remote device. In addition, after receiving a message d from the remote device by using the mobile communications network, the CPE determines that the message d includes the first port number, replaces the public IP address and the first port number in the message d with the private IP address, to obtain a message e, and performs corresponding processing on the message e. This technical solution helps enable the CPE to isolate the public IP address and the first port number, so that a corresponding resource can be released after service interaction is completed.

Figure 4:
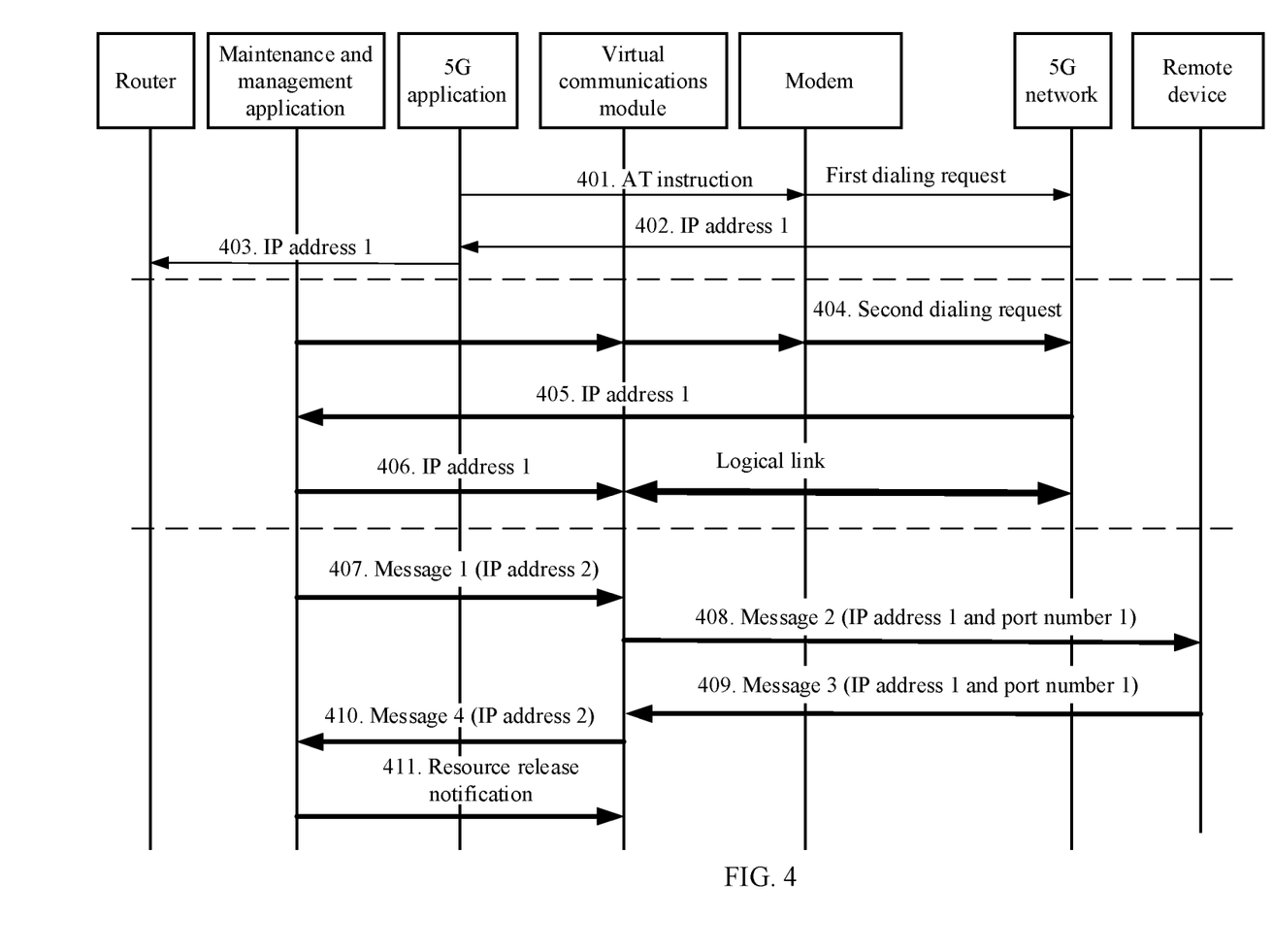
FIG. 4 is a schematic flowchart of another communication method according to an embodiment of this application.

In an example in which the mobile communications network is a 5G network, with reference to the foregoing embodiment and the CPE hardware architecture shown in FIG. 2, an embodiment of this application provides a communication method. As shown in FIG. 4, the method includes the following steps.

401. The application processor 111 of the CPE invokes a 5G application, to drive the modem 112 by using an AT instruction to initiate a first dialing request to the 5G network by using a DNN1. The first dialing request includes the DNN1. The DNN1 may be obtained by the CPE from a SIM card connected to the SIM card interface 120.

402. The 5G network receives the first dialing request, allocates an IP address 1 to the CPE based on the DNN1, and sends the IP address 1 to the CPE by using a first dialing response. The IP address 1 is a public IP address.

403. After receiving the IP address 1, the application processor 111 determines that the dialing succeeds, accesses the 5G network, and bridges the IP address 1 to the router under the CPE by using the 5G application. The CPE does not retain the IP address 1. For example, after receiving the IP address 1, the application processor 111 sends the IP address 1 to the IPF/LAN module 140 by using the 5G application, and the IPF/LAN module 140 sends the IP address 1 to the router under the CPE.

404. The application processor 111 invokes the maintenance and management application, to trigger the virtual communications module based on the DNN1, and drive the modem 112 to initiate a second dialing request to the 5G network. The second dialing request includes the DNN1.

405. The 5G network receives the second dialing request, allocates the IP address 1 to the CPE based on the DNN1, and sends the IP address 1 to the CPE by using a second dialing response.

406. After receiving the IP address 1, the application processor 111 allocates the IP address 1 to the virtual communications module, and establishes a logical link (virtual link) between the virtual communications module and the 5G network. The allocating the IP address 1 to the virtual communications module may be understood as follows. The application processor 111 stores the IP address 1 in the memory 1. The memory 1 is a dedicated memory accessed by the virtual communications module. Because the memory 1 is a dedicated memory accessed by the virtual communications module, other applications such as the maintenance and management application and the 5G application cannot access the memory, and information stored in the memory 1 is isolated.

407. When the maintenance and management application needs to initiate a service request to the remote device, the application processor 111 generates a message 1 based on a preconfigured IP address 2, and sends the message 1 to the virtual communications module. The message 1 includes the IP address 2 and an IP address 3. The IP address 3 is an IP address of the remote device, and the IP address 2 is a private IP address.

408. After the virtual communications module receives the message 1, the application processor 111 replaces the IP address 2 in the message 1 with the IP address 1 and a port number 1 to obtain a message 2, and sends the message 2 to the remote device. The port number 1 is used to identify a message belonging to the CPE, and may be randomly determined from reserved port numbers, and then stored in the memory 1.

409. After receiving the message 2, the remote device determines, based on the IP address 1 and the port number 1 in the message 2, that the message 2 comes from the CPE, adds the IP address 1, the port number 1, and related information to a message 3 to be returned to the CPE based on the message 2, and sends the message 3 to the CPE.

410. After the virtual network interface card receives the message 3, the application processor 111 determines that the message 3 includes the port number 1, replaces the IP address 1 and the port number 1 in the message 3 with the IP address 2, to obtain a message 4, and then sends the message 4 to the maintenance and management application for corresponding processing.

Further, in some embodiments, there is 411. When the maintenance and management application detects an event (for example, service interaction is completed), the application processor 111 instructs the virtual communications module to release a resource. The resource includes one or more of the IP address 1, the port number 1, the logical link between the virtual communications module and the 5G network, and the like.

It should be noted that the maintenance and management application may alternatively not instruct the virtual communications module to release the resource.

For a specific implementation of the communication method shown in FIG. 4, refer to related descriptions in the communication method shown in FIG. 3. Details are not described herein again.

In addition, this embodiment of this application may be further applied to a bridge router such as a stand-alone 5G module or a data card.

It should be further noted that, in the foregoing embodiment, the public IP address included in the first dialing response may be different from the public IP address included in the second dialing response, whose specific implementation is the same as the implementation when the public IP address included in the first dialing response is the same as the public IP address included in the second dialing response, and details are not described herein again.

It should be understood that the foregoing embodiments may be used independently, or may be used in combination with each other, to achieve different technical effects.

In the embodiments provided in this application, the methods provided in the embodiments of this application are described from a perspective in which the electronic device is used as an execution body. To implement functions in the methods provided in the embodiments of this application, the electronic device may include a hardware structure and/or a software module, and implement the functions in a form of the hardware structure, the software module, or a combination of the hardware structure and the software module. Whether a specific function of the foregoing functions is implemented in a manner of a hardware structure, a software module, or a combination of a hardware structure and a software module depends on particular applications and design constraints of the technical solutions.

Figure 5:
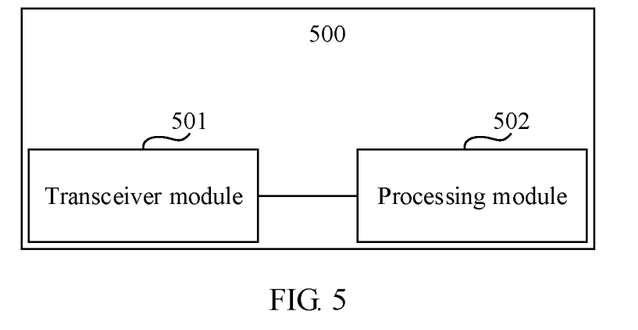
FIG. 5 is a schematic diagram of a structure of an electronic device according to an embodiment of this application.

Based on a same concept, FIG. 5 shows a device 500 according to this application, configured to perform the display method shown in FIG. 3 or FIG. 4. For example, the device 500 includes a transceiver module 501 and a processing module 502.

For example, the transceiver module 501 is configured to send a message to or receive a message from a mobile communications network, for example, send a first dialing request or a second dialing request. The processing module 502 is configured to process a message, identify whether the message is a message sent to the device 500, and the like.

Figure 6:
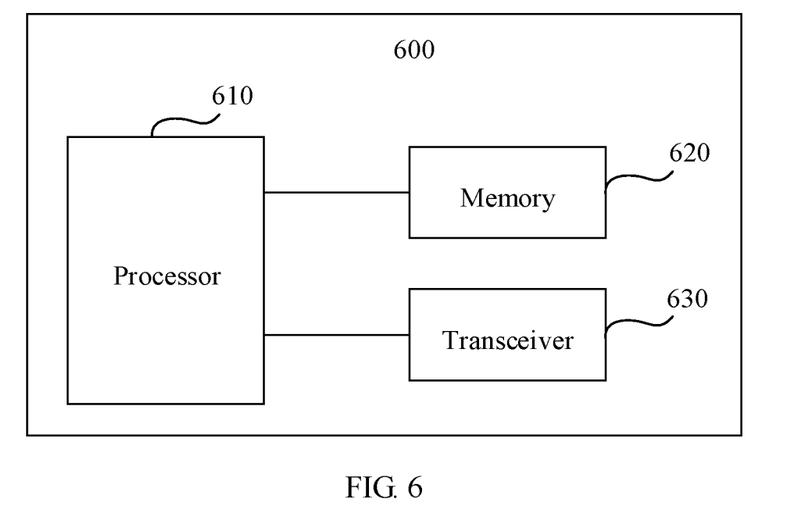
FIG. 6 is a schematic diagram of a structure of another electronic device according to an embodiment of this application.

Based on a same concept, FIG. 6 shows a device 600 according to this application. The device 600 includes at least one processor 610, a memory 620, and a transceiver 630. The processor 610 is coupled to the memory 620 and the transceiver 630. Coupling in this embodiment of this application is indirect coupling or communication connection between apparatuses, units, or modules, may be implemented in electrical, mechanical, or other forms, and are used for information exchange between the apparatuses, the units, or the modules. A connection medium between the transceiver 630, the processor 610, and the memory 620 is not limited in this embodiment of this application. For example, the memory 620, the processor 610, and the transceiver 630 may be connected through buses in FIG. 6 in this embodiment of this application. The buses may be classified into an address bus, a data bus, a control bus, and the like.

Further, the memory 620 is configured to store program instructions.

The transceiver 630 is configured to receive and/or send messages, and the like.

When the program instructions stored in the memory 620 are executed by the processor 610, the device 600 is enabled to perform the communication method shown in FIG. 3 or FIG. 4.

In this embodiment of this application, the processor 610 may be a general-purpose processor, a digital signal processor (DSP), an application-specific integrated circuit (ASIC), a field-programmable gate array (FPGA) or another programmable logic device (PLD), a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by using a hardware processor, or may be performed by using a combination of hardware in the processor and a software module.

In the embodiments of this application, the memory 620 may be a non-volatile memory, for example, a hard disk drive (HDD) or a solid-state drive (SSD), or may be a volatile memory, for example, a RAM. The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

Figure 7A:
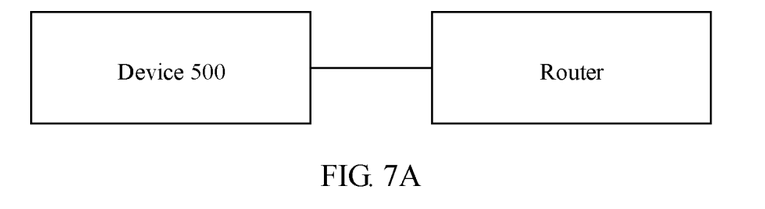
FIG. 7A is a schematic diagram of a communications system according to an embodiment of this application.
Figure 7B:
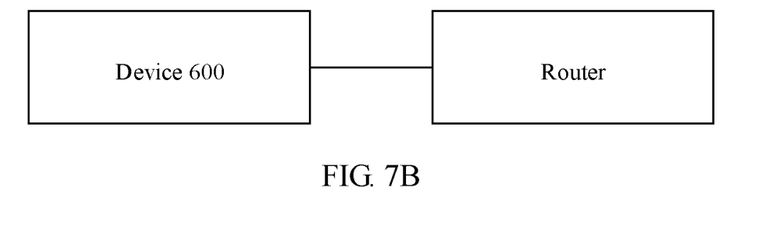
FIG. 7B is a schematic diagram of another communications system according to an embodiment of this application.

FIG. 7A shows a communications system according to an embodiment of this application, including a device 500 and a router. Alternatively, FIG. 7B shows another communications system according to an embodiment of this application, including a device 600 and a router.

It should be understood that the device 500 and the device 600 may be configured to implement the methods shown in FIG. 3 and FIG. 4 in the embodiments of this application. For related features, refer to the foregoing descriptions. Details are not described herein again.

A person skilled in the art may clearly understand that the embodiments of this application may be implemented by hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium that can be accessed by a computer. This is used as an example but is not limited to the following. The computer-readable medium may include a RAM, a read-only memory (ROM), an electrically erasable programmable ROM (EEPROM), a compact disc (CD) ROM (CD-ROM) or another CD storage, a magnetic disk storage medium or another magnetic storage device, or any other medium that can be configured to carry or store desired program code in a form of an instruction or a data structure and that can be accessed by the computer. In addition, any connection may be appropriately defined as a computer-readable medium. For example, if software is transmitted from a website, a server, or another remote source by using a coaxial cable, an optical fiber and optical cable, a twisted pair, a digital subscriber line (DSL), or wireless technologies such as infrared, radio, and microwave, the coaxial cable, the optical fiber and optical cable, the twisted pair, the DSL, or the wireless technologies such as infrared, radio, and microwave are included in a definition of a medium to which the coaxial cable, the optical fiber and optical cable, the twisted pair, the DSL, or the wireless technologies such as the infrared, the radio, and the microwave belong. For example, a disk and a disc that are used in the embodiments of this application include a CD, a laser disc, an optical disc, a DIGITAL VERSATILE DISC (DVD), a floppy disk, and a BLU-RAY disc. The disk usually magnetically copies data, and the disc optically copies data in a laser manner. The foregoing combination should also be included in the protection scope of the computer-readable medium.

In conclusion, the foregoing descriptions are merely embodiments of this application, but are not intended to limit the protection scope of this application. Any modification, equivalent replacement, improvement, or the like made based on the disclosure of this application shall fall within the protection scope of this application.

What is claimed is:

1. A method, comprising:
   sending, to a mobile communications network, a first dialing request comprising a data network name;
   receiving, from the mobile communications network based on the first dialing request, a first dialing response comprising a public Internet Protocol (IP) address;
   accessing the mobile communications network;
   bridging the public IP address to a router coupled to a network device;
   receiving, from the mobile communications network, a first message, wherein the first message comprises the public IP address;
   detecting whether the first message comprises a first identifier corresponding to the network device, wherein the first identifier comprises a port number of the network device, and wherein the first identifier is used to distinguish whether the first message belongs to the network device;
   processing, by the network device, the first message when the first message comprises the first identifier; and
   forwarding, by the network device, the first message to the router to prompt the router to process the first message when the first message does not comprise the first identifier.

2. The method of claim 1, wherein before receiving the first message, the method further comprises sending, to the mobile communication network, a second message carrying the public IP address and the first identifier, and wherein after receiving the first message, the method further comprises processing, according to the first identifier comprised in the first message, the first message.

3. The method of claim 2, further comprising further receiving a second dialing response using the port number.

4. The method of claim 2, wherein the first identifier is preconfigured.

5. The method of claim 2, further comprising randomly selecting assigning the first identifier.

6. The method of claim 2, wherein the second message further comprises a destination IP address indicating a destination device to receive the first message, and wherein the second message notifies the first identifier to the destination device.

7. The method of claim 6, wherein before sending the second message to the mobile communications network, the method further comprises:
   generating a third message comprising a private IP address preconfigured in the network device; and
   replacing the private IP address in the third message with the public IP address to obtain the second message.

8. The method of claim 2, further comprising:
   storing a correspondence of a private IP address and the public IP address;
   replacing, based on the correspondence, the public IP address in the first message with the private IP address to obtain a third message; and
   processing the third message.

9. The method of claim 1, further comprising:
   receiving, from the mobile communications network, a fourth message;
   detecting that the fourth message does not comprise the first identifier; and
   forwarding, based on the detecting, the fourth message to the router.

10. The method of claim 1, further comprising periodically sending, to the mobile communications network, a second dialing request.

11. The method of claim 1, further comprising:
    acquiring the public IP address from a second dialing response;
    establishing, using the public IP address, a logical link with the mobile communication network;
    detecting a trigger event; and
    in response to the trigger event:
       releasing the logical link; and
       deleting the public IP address.

12. The method of claim 1, wherein the network device is a customer-premises equipment (CPE).

13. An apparatus, comprising:
    a memory configured to store instructions; and
    one or more processors coupled to the memory and configured to execute the instructions to cause the apparatus to be configured to:
       send, to a mobile communications network, a first dialing request comprising a data network name;
       receive, from the mobile communications network based on the first dialing request, a first dialing response comprising a public Internet Protocol (IP) address;
       access the mobile communications network;
       bridge the public IP address to a router coupled to the apparatus;

receive, from the mobile communications network, a first message, wherein the first message comprises the public IP address;

detect whether the first message comprises a first identifier corresponding to the apparatus, wherein the first identifier comprises a port number of the apparatus, and wherein the first identifier is used to distinguish whether the first message belongs to the apparatus;

process, by the apparatus, the first message when the first message comprises the first identifier; and forward, by the apparatus, the first message to the router to prompt the router to process the first message when the first message does not comprise the first identifier.

14. The apparatus of claim 13, wherein when executed by the one or more processors, the instructions further cause the apparatus to be configured to:

send, to the mobile communication network, a second message carrying the public IP address and the first identifier; and process, according to the first identifier comprised in the first message, the first message.

15. The apparatus of claim 14, wherein when executed by the one or more processors, the instructions further cause the apparatus to be configured to further receive a second dialing response using the port number.

16. The method of claim 1, further comprising selecting, based on a preset algorithm, the port number.

17. The method of claim 1, further comprising selecting, based on a communications protocol, the port number.

18. The method of claim 1, further comprising randomly selecting the port number from reserved port numbers.

19. The method of claim 1, wherein the network device comprises a customer premises equipment (CPE) comprising a modem configured to communicate with the mobile communications network, and wherein the CPE is configured to forward messages from the mobile communications network to the router.

20. The method of claim 19, wherein the mobile communications network comprises a fifth generation (5G) mobile communications network, wherein the modem is configured to communicate with the 5G mobile communications network, and wherein the CPE is configured to forward messages from the 5G mobile communications network to the router.

21. A computer program product comprising instructions stored on a non-transitory computer-readable medium that, when executed by one or more processors, cause an apparatus to:

send, to a mobile communications network, a first dialing request comprising a data network name;

receive, from the mobile communications network based on the first dialing request, a first dialing response comprising a public Internet Protocol (IP) address;

access the mobile communications network;

bridge the public IP address to a router coupled to the apparatus;

receive, from the mobile communications network, a first message, wherein the first message comprises the public IP address;

detect whether the first message comprises a first identifier corresponding to the apparatus, wherein the first identifier comprises a port number of the apparatus, and wherein the first identifier is used to distinguish whether the first message belongs to the apparatus;

process, by the apparatus, the first message when the first message comprises the first identifier; and forward, by the apparatus, the first message to the router to prompt the router to process the first message when the first message does not comprise the first identifier.

* * * * *